United States Patent
Wilson et al.

(10) Patent No.: US 10,447,031 B2
(45) Date of Patent: Oct. 15, 2019

(54) FAULT CURRENT LIMITER WITH MODULAR MUTUAL REACTOR

(71) Applicant: Varian Semiconductor Equipment Associates, Inc., Gloucester, MA (US)

(72) Inventors: Adrian Wilson, Newcastle upon Tyne (GB); Shankar Kodle, Bangalore (IN); Saeed Jazebi, Peabody, MA (US); Piotr Lubicki, Peabody, MA (US)

(73) Assignee: VARIAN SEMICONDUCTOR EQUIPMENT ASSOCIATES, INC., Gloucester, MA (US)

( * ) Notice: Subject to any disclaimer, the term of this patent is extended or adjusted under 35 U.S.C. 154(b) by 499 days.

(21) Appl. No.: 15/339,211

(22) Filed: Oct. 31, 2016

(65) Prior Publication Data

US 2018/0123338 A1     May 3, 2018

(51) Int. Cl.
*H02H 9/00*     (2006.01)
*H02H 9/02*     (2006.01)

(52) U.S. Cl.
CPC .................................. *H02H 9/021* (2013.01)

(58) Field of Classification Search
None
See application file for complete search history.

(56) References Cited

U.S. PATENT DOCUMENTS

| | | | |
|---|---|---|---|
| 9,270,110 B2 | 2/2016 | Tekletsadik | |
| 9,306,386 B2 * | 4/2016 | Kuznetsov | ............. H02M 1/32 |
| 9,331,476 B2 * | 5/2016 | Tekletsadik | ............ H02H 9/021 |
| 2002/0018327 A1 | 2/2002 | Walker et al. | |
| 2012/0264613 A1 | 10/2012 | Tekletsadik | |
| 2014/0100116 A1 | 4/2014 | Schlenga et al. | |
| 2015/0162742 A1 | 6/2015 | Tekletsadik | |
| 2016/0013634 A1 | 1/2016 | Hall | |

FOREIGN PATENT DOCUMENTS

KR     10-1108664 B1     1/2012

OTHER PUBLICATIONS

International Search Report and Written Opinion dated Dec. 15, 2017 for PCT/US2017/050899 filed Sep. 11, 2017.

* cited by examiner

*Primary Examiner — Stephen W Jackson*

(57) ABSTRACT

Embodiments of the disclosure include a fault current limiter having a first current splitting device including a primary winding and secondary winding wound around a first core, and a second current splitting device including a primary winding and a secondary winding wound around a second core. The fault current limiter may further include a fault current limiter module (e.g., a switching module) electrically connected in series between the secondary winding of the first current splitting device and the secondary winding of the second current splitting device. The fault current limiter may further include a second fault current limiter module electrically connected in series with the secondary winding of the second current splitting device. By splitting the fault current limiter into parts with fault current limiter modules interspersed between the windings, the fault current limiter may be to be built with less insulation between the windings.

18 Claims, 3 Drawing Sheets

FAULT CURRENT LIMITER WITH MODULAR MUTUAL REACTOR

FIELD

This disclosure relates to fault current limiters, and more particularly to a fault current limiter system having a fault current limiter switching module interspersed between windings.

BACKGROUND

A fault current limiter (FCL) is a device for limiting fault currents, such as in a power system. Various types of FCLs have been developed over the last several decades, including superconducting fault current limiters (SCFCLs), solid state fault current limiters, inductive fault current limiters, as well as other varieties known in the art. The FCL may be implemented in a system having generation, transmission, and distribution networks for providing power to various industrial, commercial, and/or residential electrical loads.

A fault current is an abnormal current in an electrical system resulting from a fault in the system, such as a short circuit. A fault current may arise in a system due to any number of events or failures, such as power lines or other system components being damaged by severe weather (e.g. lightning strikes). When such a fault occurs, a large current (a fault current) can quickly appear in the circuit as the current is no-longer limited by load. This surge of current is undesirable because of potential damage to the load, including the network itself, or equipment connected to the network.

Some prior art fault current limiters include a current splitting reactor having interleaved windings, wherein the current splitting reactor includes a core, a first winding wound around the core, and a second winding wound around the core and interleaved with the first winding to reduce an insertion impedance of the fault current limiter. Lower losses may be achieved by interleaving primary and secondary windings. Prior art fault current limiters built as a combined reactor may suffer from a build-up of inter-winding voltage. As the voltage increases, the necessary insulation at the points of interleaving correspondingly increases, thus making the fault current limiter bulky and making flux cancelation more difficult to achieve.

With respect to these and other considerations the present disclosure is provided.

BRIEF SUMMARY

A fault current limiter according to an embodiment of the present disclosure includes a first current splitting device comprising a primary winding and secondary winding wound around a first core, a second current splitting device comprising a primary winding and a secondary winding wound around a second core. The fault current limiter further includes a fault current limiter module electrically connected in series between the secondary winding of the first current splitting device and the secondary winding of the second current splitting device.

A power system according to an embodiment of the present disclosure includes a power source, a load electrically connected to the power source, a fault current limiter electrically coupled to the power source and the load to limit an amount of current during a fault condition. The fault current limiter includes a first current splitting device having a primary winding and secondary winding wound around a first core, a second current splitting device comprising a primary winding and a secondary winding wound around a second core. The fault current limiter further includes a fault current limiter module electrically connected in series between the secondary winding of the first current splitting device and the secondary winding of the second current splitting device.

A fault current limiter according to an embodiment of the disclosure includes a first current splitting device having a primary winding and secondary winding wound around a first core, and a second current splitting device comprising a primary winding and a secondary winding wound around a second core. The fault current limiter may further include a first fault current limiter module electrically connected in series between the secondary winding of the first current splitting device and the secondary winding of the second current splitting device, and a second fault current limiter module electrically connected in series with the secondary winding of the second current splitting device.

BRIEF DESCRIPTION OF THE DRAWINGS

The accompanying drawings illustrate exemplary approaches of the disclosure, including the practical application of the principles thereof, as follows.

Figure 1:
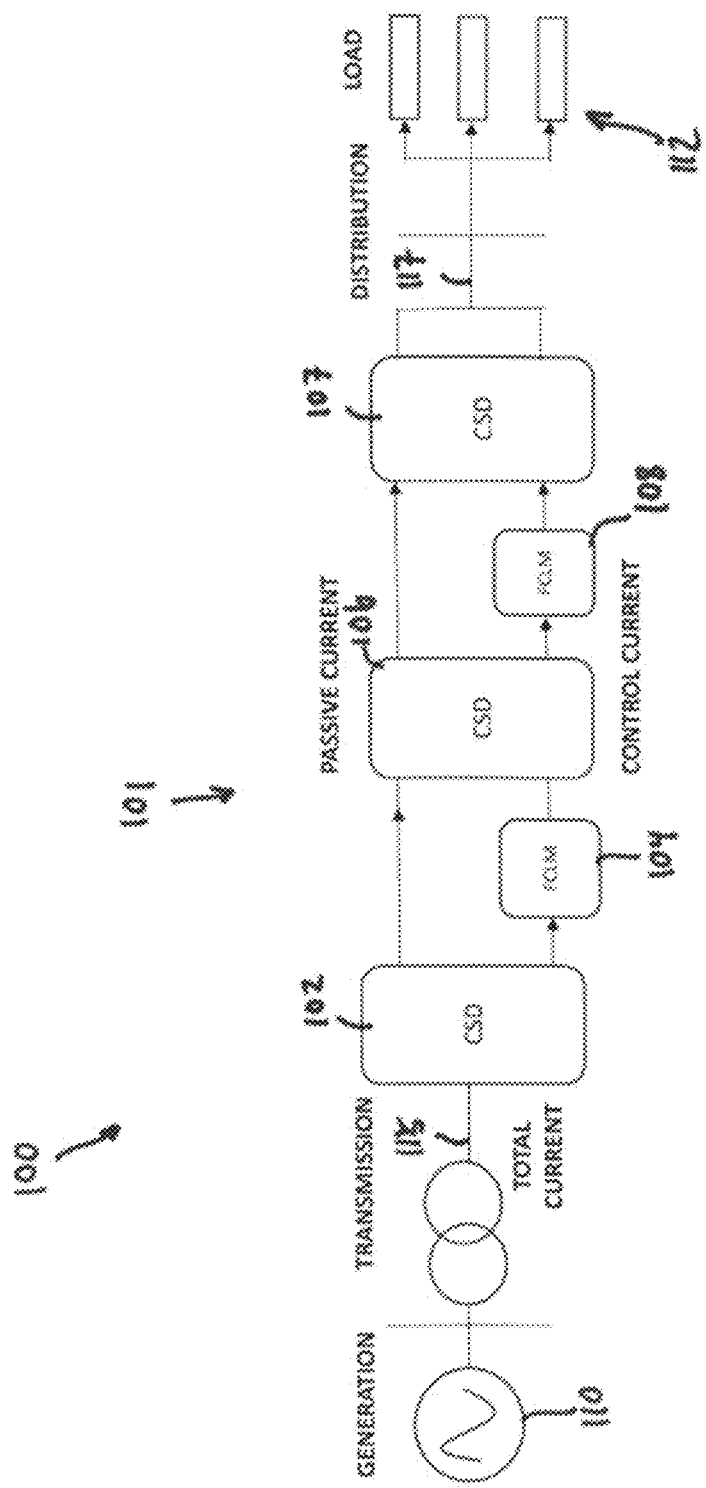
FIG. 1 depicts a power system according to embodiments of the disclosure.

The drawings are not necessarily to scale. The drawings are merely representations, not intended to portray specific parameters of the disclosure. The drawings are intended to depict exemplary embodiments of the disclosure, and therefore are not be considered as limiting in scope. In the drawings, like numbering represents like elements.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so this disclosure will be thorough and complete, and will fully convey the scope of the subject matter to those skilled in the art. In the drawings, like numbers refer to like elements throughout.

As used herein, an element or operation recited in the singular and proceeded with the word "a" or "an" are understood as possibly including plural elements or operations, except as otherwise indicated. Furthermore, references to "one embodiment" or "some embodiments" of the present disclosure may be interpreted as including the existence of additional embodiments also incorporating the recited features.

The present embodiments involve approaches for improved fault current protection. More specifically, various embodiments address issues relating to an increased voltage drop across windings in a current splitting device, and the corresponding increased insulation between the windings. For example, by splitting the fault current limiter (FCL) into parts with the FCL switching modules interspersed between windings of the current splitting device, the fault current limiter may be built with less insulation between the windings, thus making the task of cancelling out the flux and therefore impedance, easier.

In some embodiments, a fault current limiter has a first current splitting device including a primary winding and secondary winding wound around a first core, and a second current splitting device including a primary winding and a secondary winding wound around a second core. The fault current limiter may further include a fault current limiter module (e.g., a switching module) electrically connected in series between the secondary winding of the first current splitting device and the secondary winding of the second current splitting device. The fault current limiter may further include a second fault current limiter module electrically connected in series with the secondary winding of the second current splitting device. By splitting the fault current limiter into parts, with fault current limiter modules interspersed between the windings, the fault current limiter may advantageously be to be built with less insulation between the windings.

Turning now to FIG. 1, an exemplary power system according to embodiments of the present disclosure will be described. As shown, the power system 100, including a fault current limiter (FCL) 101, is implemented to include generation, transmission, and distribution networks generating and delivering power to various industrial, commercial, and/or residential electrical loads. The FCL 101 may include a first current splitting device (CSD) 102 electrically coupled with a first fault current limiter module (FCLM) 104, and a second current spitting device (CSD) 106 electrically coupled with the CSD 102. The FCL 101 may include a third CSD 107 in some embodiments. As shown, the second CSD 106 is further coupled to the first FCLM 104 and the third CSD 107, and with a second FCLM 108. In some embodiments, each of the first and second CSDs 102, 106 is a modular current splitting reactor having interleaved windings, as will be described in greater detail below.

As further shown, the power system 100 may be electrically connected in series intermediate an AC power source 110 and one or more electrical loads 112 via conductors 115 and 117. One of ordinary skill in the art will appreciate the FCL 101 can be implemented in a variety of other applications and power system configurations where fault current limiting is desirable. The particular power system 100 depicted in FIG. 1 is therefore shown by way of example, and is not intended to be limiting.

Each of the first, second, and third CSDs 102, 106, 107 may have an open core design. The FCL 101 including current splitting devices 102, 106, and 107, each having interleaved windings, advantageously provides low insertion impedance. As an example, the FCL 101 described herein may have insertion impedance during normal operating conditions resulting in a voltage dropped across the impedance, when carrying full load current, being less than 1% of the total system voltage.

The FCL 101 described herein may be implemented to limit fault currents in any electrical system, such as, for example, transmission, distribution, and generation systems. Furthermore, in some cases, the CSDs 102, 106, 107 with interleaved windings may be implemented in a superconducting FCL, a solid state FCL, a fast switch FCL, or in general, any fault current limiting circuit configured to protect a system from fault currents where low insertion impedance is intended during normal operation. In some examples, the FCL 101 may incorporate saturated iron cores or shielded cores. In one non-limiting illustrative example, the FCL 101 with first and second CSDs 102, 106, 107 having interleaved windings as described herein, may be provided to lower the insertion impedance of a saturated iron core FCL having a high insertion impedance. Furthermore, various examples provided herein may be implemented in FCL devices for high or low frequency systems.

Figure 2:
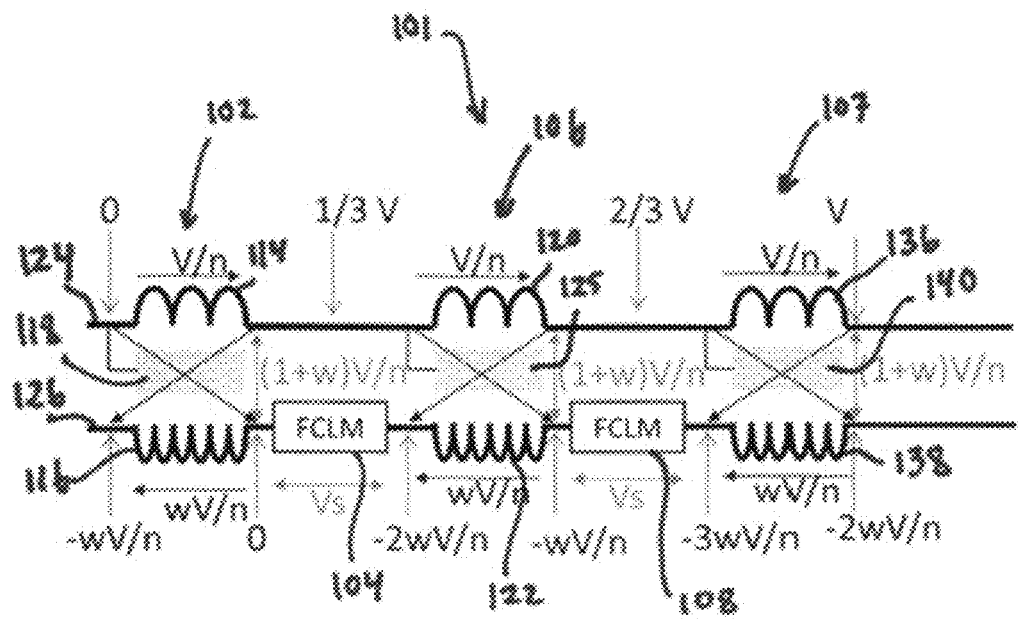
FIG. 2 depicts an exemplary fault current limiter according to embodiments of the disclosure.

Referring now to FIGS. 1-2, the FCL 101 will be described in greater detail. As shown, the first current splitting device 102 of the FCL 101 may include a primary winding 114 and a secondary winding 116 wound around a first core 118, such as an iron or air core. In one embodiment, the primary winding 114 and the secondary winding 116 may be concentrically wound around an iron core referenced to the input (line) voltage and floated or insulated from earth and/or other CSD cores. The second CSD 106 comprises a primary winding 120 and a secondary winding 122 wound around a second core 125. The FCL 101 further includes the first FCLM 104 electrically connected in series between the secondary winding 116 of the first CSD 102 and the secondary winding 122 of the second CSD 106. As shown, the windings of each of the first and second CSDs 102, 106 are arranged in parallel with one another. Furthermore, the primary winding 114 of the first CSD 102 is electrically connected in series with the primary winding 120 of the second CSD 106, for example, along a path 124, and the primary winding 114 of the first CSD 102 is electrically connected in parallel with the first FCLM 104. In some embodiments, the primary winding 114 and the secondary winding 116 wound around the first core 118 have a same or a different number of turns. Similarly, the primary winding 120 and the secondary winding 122 wound around the second core 125 have a same or a different number of turns.

The FCL 101 may further include a third CSD 107 having a primary winding 136 and a secondary winding 138 wound around a third core 140. The second FCLM 108 is electrically connected in series between the secondary winding 122 of the second CSD 106 and the secondary winding 138 of the third CSD 107. As arranged, the first FCLM 104 and the second FCLM 108 are electrically connected in series along a path 126. Furthermore, the primary winding 120 of the second CSD 106 is electrically connected in series with the primary winding 114 of the first CSD 106 and the primary winding 136 of the third CSD 107, for example, along a path 124. The primary winding 120 of the second CSD 106 is also electrically connected in parallel with the first FCLM 104 and the second FCLM 108. Each of the windings of the first, second, and third CSDs 102, 106, 107 may be configured to exhibit minimal impedance during a steady state operation, and a comparatively larger impedance, for example, from the primary windings in series, when the secondary windings are open circuited, such as during a fault condition, so as to effectively limit the fault current.

Figure 3:
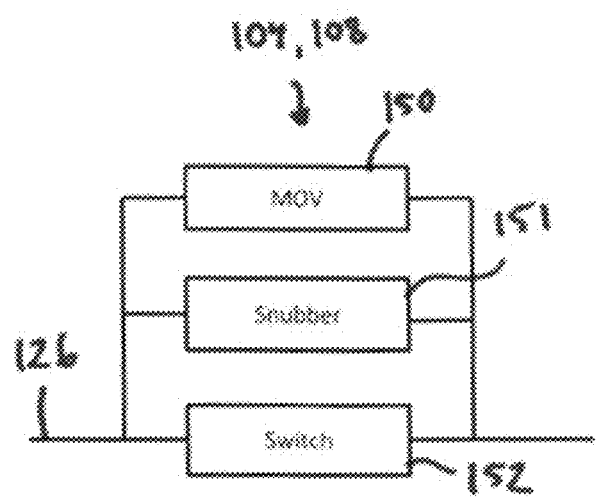
FIG. 3 depicts an exemplary fault current limiter module of the fault current limiter of FIG. 2 according to embodiments of the disclosure.

In some embodiments, the FCL 101 may include a series of switches, such as any fast opening technology, e.g., superconductor based, saturable iron core, mechanical or solid state switches with a voltage protection device and a voltage control device. For example, as shown in FIG. 3, each of the first and second FCLMs 104, 108 may include a metal oxide varistor (MOV) 150, a snubber 151, and a solid state switch 152 each arranged in parallel with one another.

Figure 4:
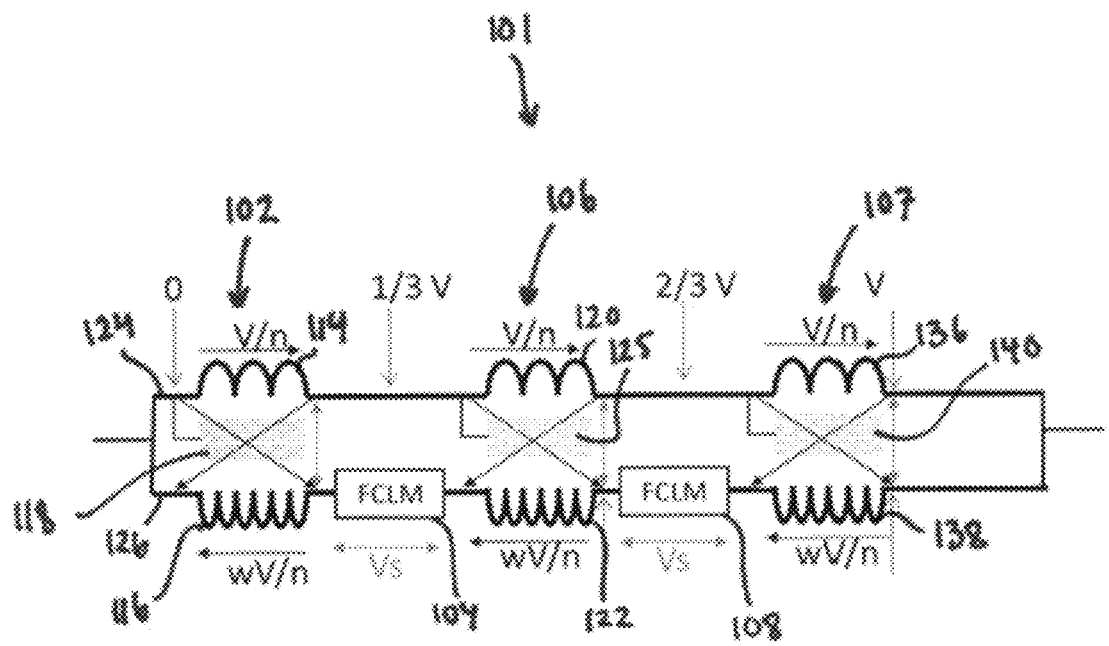
FIG. 4 depicts the exemplary fault current limiter of FIG. 2 with closed ends according to embodiments of the disclosure.

Referring now to FIGS. 2 and 4, operation of the FCL 101 will be described in greater detail. In an exemplary embodiment, during a steady state condition, the primary winding 114 and the secondary winding 116 of the first CSD 102 may be set to distribute the steady state current along parallel paths 124 and 126 in a predefined manner. For example, if x % of the steady state current flows along path 124, then the remainder (100−x) % of the steady state current flows along path 126. In one embodiment, the current may be distributed so 50% flows along path 124 and 50% flows along path 126. In other embodiments, the ratio may be set to 40% flowing along path 124 and 60% flowing along path 126; 30% flowing along path 124 and 70% flowing along path 126, etc.

During a fault current condition, a fault current higher than the normal current flows into the primary winding 114 and the secondary winding 116. When the fault current exceeds a predefined trigger current, the amount of current flowing through the secondary winding 116 is reduced. As such, the amount of amper-turns flowing through the primary winding 114 and the secondary winding 116 is no longer equal and the magnetic fields within the core 118 will no longer cancel out, thus increasing the reactance of the first CSD 102. This causes the insertion impedance of the FCL 101 to increase as a result, thus limiting the fault current. Similar results may be achieved by each of the second CSD 106 and the third CSD 107.

As will be appreciated, one drawback with conventional fault current limiters built as a combined reactor is the build-up of inter-winding voltage. For example, in the case an exemplary FCL includes a 33 kV limiter (19.0 kV to earth) with 75% limiting and 5:1 transformer ratio to control the secondary current, the primary winding will see 19.0 kV to earth and drop 14.3 kV when limiting. The secondary winding will also see 19 kV to earth when the FCL switching modules are closed, yet 71.5 kV (14.3 kV×5) when the switching modules open. In the case the reactors are insulated separately from earth and the FCL is a mutual reactor, the maximum inter-winding voltage during a solid fault on the load side will be 14.3 kV+71 kV=85.8 kV. Thus, making an interleaved winding with insulation levels approaching 85.8 kV where at least 99% of the flux cancels is a significant engineering challenge.

Generalizing the flux cancellation problem, for a primary winding with voltage drop V, and a secondary winding with turns ratio 1:w in relation to the primary winding, the voltage developed between windings is a maximum of (1+w)V. If the secondary winding has two FCLMs attached thereto, the voltage across each module (Vs) can be calculated by solving the following equation:

$$V = -wV + 2Vs. => (1+w)V/2 = Vs.$$

To address the engineering challenge, embodiments of the present disclosure may split FCL 101 into multiple parts or modules, such as first, second, and third CSDs 102, 106, 107, and provide the FCLMs 104 and 108 interspersed between the windings, as described in greater detail above. This allows each CSD to be built with less insulation between the primary and secondary windings, and thus makes the task of cancelling out the flux, and therefore impedance, easier.

More specifically, as shown, the FCL 101 is split into 'n' parts (e.g., 'n' CSDs), each part including a primary winding with voltage drop V and a secondary winding with turns ratio 1:w in relation to the primary winding. The voltage developed between windings is thus a maximum of (1+w) V/n. By closing the ends of the reactor arrangement, for example as shown in FIG. 4, the voltages of each FCLM 104, 108 can be calculated as follows:

$$V = -wV/n + Vs - wV/n + Vs - wV/n => V = -3wV/n + 2Vs$$

Because n=3 in this example, the voltages can be calculated as follows:

$$V = -wV + 2Vs => (1+w)V/2 = Vs.$$

As a result, the total voltage seen over all modules is (1+w)V. In this case, by splitting the reactor into 27 segments, and installing 26 switches (e.g., rated at least 3.3 kV each), the inter-winding voltage in the reactor segments will be 1.65 kV, making the insulation needs for FCL 101 much more attainable.

Figure 5:
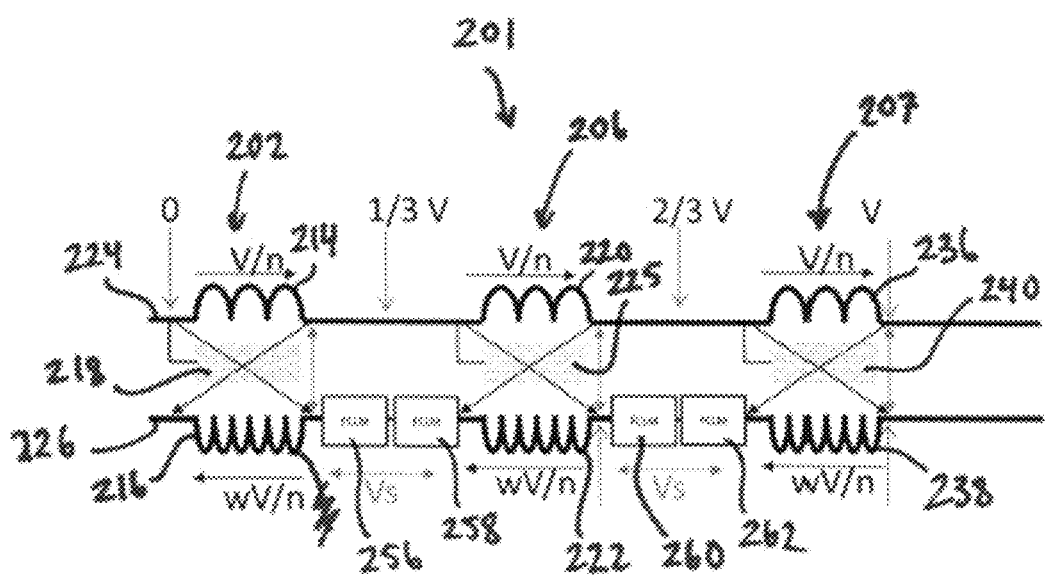
FIG. 5 depicts an exemplary fault current limiter including multiple fault current limiter switching modules disposed between windings according to embodiments of the disclosure.

Turning now to FIG. 5, a FCL 201 according to another embodiment of the disclosure will be described. As shown, in this embodiment, the FCL 201 includes multiple FCLMs 256, 258 electrically connected in series between a secondary winding 216 of a first CSD 202 and a secondary winding 222 of a second CSD 206. The FCL 201 may further include multiple FCLMs 260, 262 connected in series between the secondary winding 222 of the second CSD 206 and a secondary winding 238 of a third CSD 207. As arranged, the FCL 201 is split into nx segments, wherein x=the number of FCLMs. The maximum inter-winding stand-off voltage will therefore be (1+w)×V/n.

Similar to embodiments described above, the first CSD 202 of the FCL 201 may include a primary winding 214 and the secondary winding 216 wound around a first core 218. The second CSD 206 comprises a primary winding 220 and the secondary winding 222 wound around a second core 225. The FCLMs 256 and 258 of the FCL 201 are electrically connected in series between the secondary winding 216 of the first CSD 202 and the secondary winding 222 of the second CSD 206. As shown, the primary winding 214 of the first CSD 202 is electrically connected in series with the primary winding 220 of the second CSD 206, for example, along a path 224, and the primary winding 214 of the first CSD 202 is electrically connected in parallel with the FCLMs 256 and 258. In some embodiments, the primary winding 214 and the secondary winding 216 wound around the first core 218 may have a same or different number of turns. Similarly, the primary winding 220 and the secondary winding 222 wound around the second core 225 may have a same or different number of turns.

The FCL 201 may further include the third CSD 207 having a primary winding 236 and the secondary winding 238 wound around a third core 240. The FCLMs 260, 262 are electrically connected in series between the secondary winding 222 of the second CSD 206 and the secondary winding 238 of the third CSD 207. As arranged, FCLMs 256, 258, 260, and 262 are electrically connected in series along a path 226. Furthermore, the primary winding 220 of the second CSD 206 is electrically connected in series with the primary winding 214 of the first CSD 206 and the primary winding 236 of the third CSD 207, for example, along the path 224. The primary winding 220 of the second CSD 206 and the primary winding 236 of the third CSD 207 are also electrically connected in parallel with FCLMs 256, 258, 260, and 262. Each of the first and second windings of the first, second, and third CSDs 202, 206, 207 may be configured to exhibit minimal impedance during a steady state operation, and a comparatively larger impedance during a fault condition shown in so as to effectively limit the fault current.

In summary, various embodiments herein describing FCLMs between windings of a CSD provide a first advantage including reduced insulation amounts between parallel windings of each CSD, and a second advantage including improved cancelling of the flux between primary and secondary windings in the CSDs when the primary and secondary windings are energized.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A fault current limiter comprising:
    a first current splitting device comprising a primary winding and secondary winding wound around a first core;
    a second current splitting device comprising a primary winding and a secondary winding wound around a second core; and
    a fault current limiter module electrically connected in series between the secondary winding of the first current splitting device and the secondary winding of the second current splitting device;
    wherein the primary winding of the first current splitting device is electrically connected in series with the primary winding of the second current splitting device.

2. The fault current limiter of claim 1, further comprising multiple fault current limiter modules electrically connected in series between the secondary winding of the first current splitting device and the secondary winding of the second current splitting device.

3. The fault current limiter of claim 1, further comprising:
    a third current splitting device comprising a primary winding and a secondary winding wound around a third core; and
    a second fault current limiter module electrically connected in series between the secondary winding of the second current splitting device and the secondary winding of the third current splitting device.

4. The fault current limiter of claim 3, wherein the fault current limiter module and the second fault current limiter module are electrically connected in series.

5. The fault current limiter of claim 3, wherein the primary winding of the second current splitting device is electrically connected in parallel with the second fault current limiter module.

6. The fault current limiter of claim 1, wherein the fault current limiter module comprises a voltage protection device, a voltage control device, and a solid state switch, and wherein the voltage protection device, the voltage control device, and the solid state switch are arranged in parallel with one another.

7. The fault current limiter of claim 1, wherein the primary winding and the secondary winding of the first current splitting device have a different number of turns, and wherein the primary winding and the secondary winding of the second current splitting device have a different number of turns.

8. A power system comprising:
    a power source;
    a load electrically connected to the power source;
    a fault current limiter electrically coupled to the power source and the load to limit an amount of current during a fault condition, the fault current limiter comprising:
        a first current splitting device comprising a primary winding and secondary winding wound around a first core;
        a second current splitting device comprising a primary winding and a secondary winding wound around a second core; and
        a fault current limiter module electrically connected in series between the secondary winding of the first current splitting device and the secondary winding of the second current splitting device;
        wherein the primary winding of the first current splitting device is electrically connected in series with the primary winding of the second current splitting device.

9. The power system of claim 8, further comprising multiple fault current limiter modules electrically connected in series between the secondary winding of the first current splitting device and the secondary winding of the second current splitting device.

10. The power system of claim 8, further comprising:
    a third current splitting device comprising a primary winding and a secondary winding wound around a third core; and
    a second fault current limiter module electrically connected in series between the secondary winding of the second current splitting device and the secondary winding of the third current splitting device.

11. The power system of claim 10, wherein the fault current limiter module and the second fault current limiter module are electrically connected in series.

12. The power system of claim 10, wherein the primary winding of the second current splitting device is electrically connected in parallel with the second fault current limiter module.

13. The power system of claim 8, wherein the fault current limiter module comprises a voltage protection device, a voltage control device, and a solid state switch, and wherein the voltage protection device, the voltage control device, and the solid state switch are arranged in parallel with one another.

14. The power system of claim 8, wherein the primary winding and the secondary winding of the first current splitting device have a different number of turns, and wherein the primary winding and the secondary winding of the second current splitting device have a different number of turns.

15. A fault current limiter comprising:
    a first current splitting device comprising a primary winding and secondary winding wound around a first core;
    a second current splitting device comprising a primary winding and a secondary winding wound around a second core;
    a first fault current limiter module electrically connected in series between the secondary winding of the first current splitting device and the secondary winding of the second current splitting device; and a second fault current limiter module electrically connected in series with the secondary winding of the second current splitting device;

wherein the primary winding of the first current splitting device is electrically connected in series with the primary winding of the second current splitting device.

16. The fault current limiter of claim 15, further comprising a third current splitting device comprising a primary winding and a secondary winding wound around a third core, wherein the second fault current limiter module is electrically connected in series between the secondary winding of the second current splitting device and the secondary winding of the third current splitting device.

17. The fault current limiter of claim 15, wherein the primary winding of the second current splitting device is electrically connected in parallel with the second fault current limiter module and the first fault current limiter module.

18. The fault current limiter of claim 15, further comprising a plurality of fault current limiter modules electrically connected in series between the secondary winding of the first current splitting device and the secondary winding of the second current splitting device.

* * * * *